(12) United States Patent
Schicht

(10) Patent No.: US 11,351,554 B2
(45) Date of Patent: Jun. 7, 2022

(54) CARRIER PLATE FOR LABORATORY DEVICES

(71) Applicant: 4D Lifetec AG, Cham (CH)

(72) Inventor: Oliver Schicht, Baar (CH)

(73) Assignee: 4D LIFETEC AG, Cham (CH)

( * ) Notice: Subject to any disclaimer, the term of this patent is extended or adjusted under 35 U.S.C. 154(b) by 52 days.

(21) Appl. No.: 16/480,482

(22) PCT Filed: Jan. 30, 2018

(86) PCT No.: PCT/EP2018/052310
§ 371 (c)(1),
(2) Date: Jul. 24, 2019

(87) PCT Pub. No.: WO2018/138383
PCT Pub. Date: Aug. 2, 2018

(65) Prior Publication Data
US 2019/0388897 A1   Dec. 26, 2019

(30) Foreign Application Priority Data

Jan. 30, 2017 (CH) ..................... 00114/17

(51) Int. Cl.
*B01L 9/00* (2006.01)
*G01N 27/447* (2006.01)

(52) U.S. Cl.
CPC ............ *B01L 9/52* (2013.01); *B01L 9/54* (2013.01); *G01N 27/44704* (2013.01); *G01N 27/44782* (2013.01); *B01L 2200/025* (2013.01); *B01L 2300/06* (2013.01); *B01L 2300/0609* (2013.01); *B01L 2300/0809* (2013.01); *B01L 2300/0851* (2013.01)

(58) Field of Classification Search
None
See application file for complete search history.

(56) References Cited

U.S. PATENT DOCUMENTS

| | | | |
|---|---|---|---|
| 2010/0081189 A1* | 4/2010 | Zantl | G01N 33/4836 435/287.1 |
| 2010/0200405 A1* | 8/2010 | Lenz | B03C 1/288 204/600 |
| 2011/0194116 A1* | 8/2011 | Horiuchi | B01L 9/527 356/445 |

FOREIGN PATENT DOCUMENTS

| | | |
|---|---|---|
| AT | 411 334 | 12/2003 |
| CN | 203631083 | 6/2014 |
| DE | 20 2004 009 793 | 8/2004 |
| EP | 1 887 349 | 2/2008 |
| EP | 2 169 391 | 3/2010 |

(Continued)

OTHER PUBLICATIONS

Switzerland Search Report dated Jul. 10, 2017, Application No. 1142017, 2 pages.

(Continued)

*Primary Examiner* — Matthew D Krcha
*Assistant Examiner* — Brittany I Fisher
(74) *Attorney, Agent, or Firm* — Rankin, Hill & Clark LLP

(57) ABSTRACT

A carrier plate, which is used within an electrophoresis process, and to a holding device tailored to the carrier plate, the carrier plate having a region with a magnetic property and a positioning device. The magnetic property is designed to fix the carrier plate in the laboratory device. The positioning device is designed to guarantee a position of the carrier plate in the laboratory device.

23 Claims, 5 Drawing Sheets

(56) References Cited

FOREIGN PATENT DOCUMENTS

| | | |
|---|---|---|
| EP | 2 484 749 | 8/2012 |
| JP | S1-89552 | 5/1986 |
| WO | 2015/079048 | 6/2015 |
| WO | 2016/141495 | 9/2016 |

OTHER PUBLICATIONS

English translation of International Preliminary Report on Patentability dated Jul. 30, 2019 (Jul. 30, 2019), Application No. PCT/EP2018/052310, 7 pages.
English translation of Chinese Office Action dated Feb. 8, 2021, Application No. 201880022214.5, 3 pages.
English translation of Japanese Office Action dated Jan. 4, 2022, Application No. 2019-539945, 5 pages.

* cited by examiner

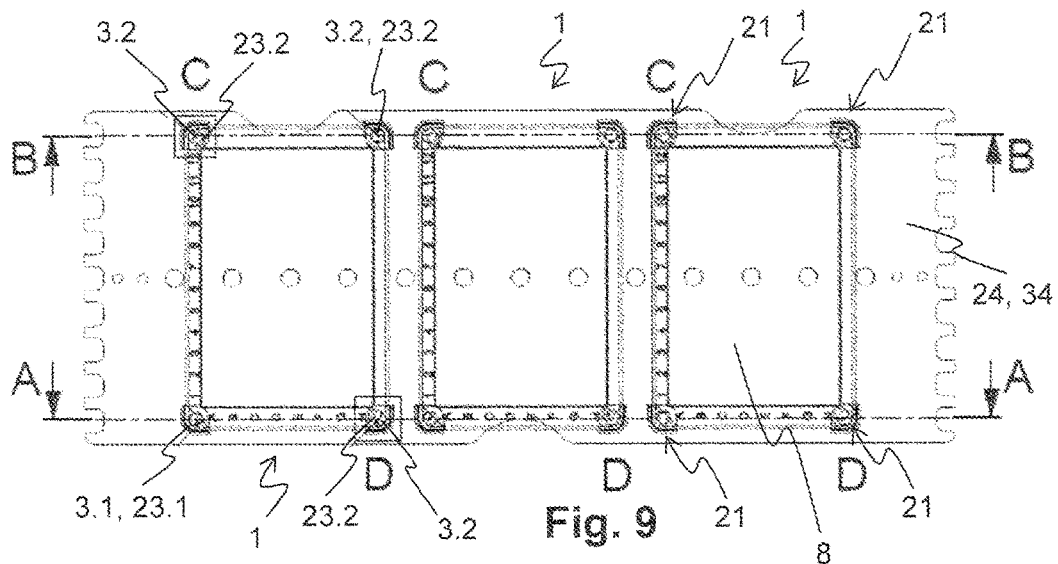
Fig. 9
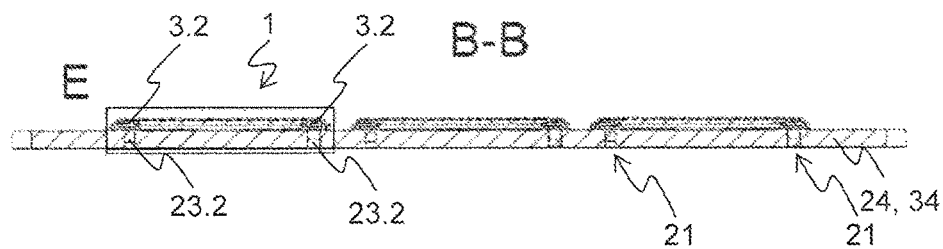
Fig. 10
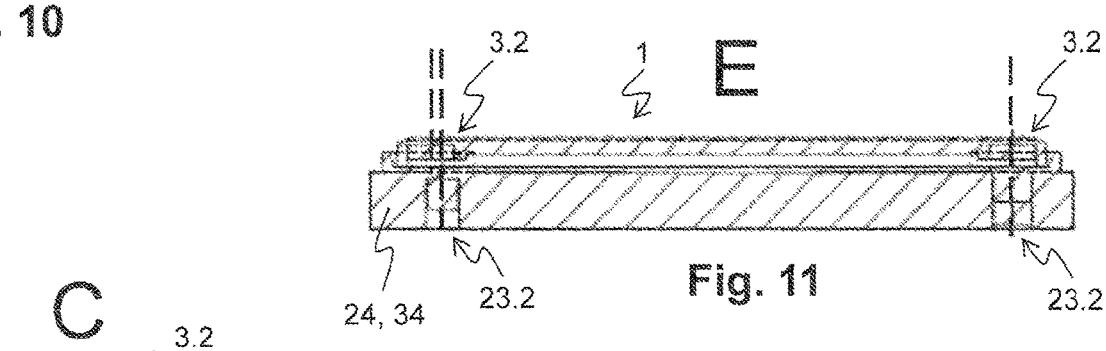
Fig. 11
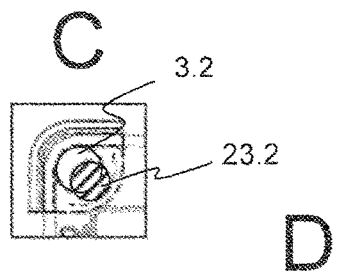
Fig. 12
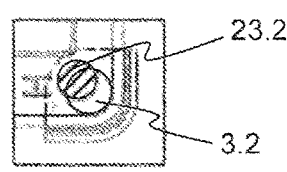

CARRIER PLATE FOR LABORATORY DEVICES

FIELD OF THE INVENTION

The invention lies in the field of laboratory devices and laboratory appliances. In particular, its subject-matter is a carrier plate and a holding appliance which is matched to the carrier plate. The invention is configured, for example, for an application in devices and appliances which are used within an electrophoresis method.

DESCRIPTION OF RELATED ART

Laboratory devices permit a multitude of laboratory-technological applications by way of them accomplishing various tasks alone or in combination. Electrophoresis, combinatorics, synthesis, reaction analysis, ELISA or composition analyses and concentration analyses are examples of such laboratory-technological applications.

Even if the laboratory-technological applications and the applied laboratory devices are very different, what they have in common however is the fact that a sample, a sample position or a starting material must be provided on a carrier that is suitable for the laboratory device. Herein, the demands on the carrier, the way and manner of how the sample, the sample position or the starting material is present on the carrier, and/or the functional interaction between the carrier and the device can be very specific. This renders the handing of the carrier more difficult and increases the error probability, for example due to incorrect manipulations by the user, in particular if several devices with specific demands are used in an application.

A demonstrative example of a laboratory-technological application, in which appliances according to the invention can be used, is electrophoresis. An electrophoresis method can be coarsely divided into three method steps: the sample preparation, the electrophoresis itself, as well as the evaluation. Very specific devices are used in these three method steps.

Concerning the sample preparation, for example a pipetting aid, with whose help the samples are deposited onto a carrier plate can be used. In many electrophoresis methods, the samples are present in the form of so-called gel-spots, which means that a substance to be examined is embedded into a carrier medium, in particular into a gel. Herein, the carrier medium acts as a molecular sieve that increases the dependency of the drift speed of a molecule of the substance on its size.

The electrophoresis itself is carried out in an electrophoresis device. Such can include, for example, a chamber that is filled with the electrophoresis buffer, as well as electrodes for producing an electrical field. In this case, the carrier plates, which are provided with the samples, are introduced into the chamber, whereupon the electrical field brings the molecules of the substance into motion in a direct manner (given charged molecules) or in an indirect manner (for example, via an ion current). A separation of the molecules of the substance along the direction of the electrical field that is predominant on a gel-spot results, wherein the separation is dependent on the one hand on the size and charging of the molecules and on the other hand on the electrical field, which affects the mentioned gel-spot, on the composition of the electrophoresis buffer, on the composition of the carrier medium and on the temperature.

The evaluation is often effected manually, which is to say a person analyses the zones of identical molecules (so-called bands), the zones occurring along an axis on the carrier plate. This is often effected amid the use of a microscope. Herein, it is extremely important for the plate not to slip during the analysis.

However, on evaluation, the longer it is, the more semi-automated or automated microscopic analysis devices are applied, such devices recording and/or analysing the zones of identical molecules (bands) that occur along the axis on the carrier plate. With regard to these analysis devices, it is not only a question of preventing the slippage of the carrier plate, but also of ensuring that the mentioned axis points in the same direction with each analysis.

The three method steps that are central to many electrophoresis methods include individually or in combination various parameters that may have a negative effect on the reproducibility and reliability—and thus on the informative value—of the measurement results that are obtained by the method. It is particularly the positioning and alignment of the individual positions for the samples that are located on the carrier plate that is of decisive importance.

For example, it is of decisive significance for the reproducibility and reliability of the evaluation for the axis, along which the zones are recorded and analysed, to correspond to the direction, along which the molecules of the substance have drifted. This necessitates a high reproducibility of the alignment of the carrier plate within a device and between different devices that participate in the electrophoresis method. Moreover, an electrical field that has different field strengths and field directions at different positions on the carrier plate adulterates the measurement results inasmuch as these differences are not taken into account on evaluation. Such a consideration however is only possible if the positions at which the samples are deposited on the carrier plate come to lie at the respective positions within the chamber in a reproducible manner.

It is not only with electrophoresis methods that devices according to the state of the art do not or only inadequately take into account the aspect of the reproducibility of the positioning and alignment within a device and, in particular, between different devices that participate in the laboratory-technological application. This can lead to measurement results that can vary greatly from laboratory to laboratory, from run to run or even within runs on using the same sample at different positions on the carrier plate.

For example, different approaches as to how one can improve a gel-electrophoresis system, in order to improve the reproducibility of measurement results that are produced amid the use of the mentioned gel-electrophoresis system are shown, for example, in WO 2016/141495 A2. Herein, it is particularly the positioning of the carrier plates in the chamber, the homogeneity of the produced electrical field in the region of the samples (gel-spots) or the flow or the temperature of the electrophoresis buffer which are optimised.

The (gel) electrophoresis systems according to EP 1887349 A2, EP 2484749 A1 and DE202004009793 U1 are not secured against faulty positioning and alignment within a device or between different devices that participate in the electrophoresis method.

WO 2015/079048 A1 addresses the problem of insufficient positioning accuracy in an indirect manner by way of the number of devices that take part in the method being reduced at a cost of an increased complexity of these. An electrophoresis system that includes an electrophoresis container, into which an electrophoresis cassette, which is matched to the electrophoresis container, can be inserted is shown. The electrophoresis container is realised in a manner such that the electrophoresis as well as the optical evaluation can be carried out within a single closed electrophoresis system. This leads to existing devices not being able to be retrofitted in regard to the electrophoresis container or to the electrophoresis cassette that is used therein. Furthermore, the electrophoresis container and the electrophoresis cassette, out of necessity are devices that are complex. Finally, the electrophoresis system according to WO 2015/079048 A1 reduces the sample throughput, by way of the electrophoresis only being able to be carried out in each case on one electrophoresis cassette.

SUMMARY OF THE INVENTION

It is therefore an object of the invention to provide a carrier plate of the initially mentioned type, as well as an associated holding appliance, which overcome the aforementioned disadvantages in laboratory-technical applications.

In particular, it is an object of the invention to provide a carrier plate that provides a high reproducibility of the positioning and/or alignment of samples, sample positions and/or starting materials, which are located on a carrier plate, on or in devices which are applied in laboratory-technological applications.

It is further an object of the invention to provide a device-side holding appliance that is matched to the carrier plate.

It is further an object of the invention to provide a carrier plate and a holding appliance that permit a simple retrofitting of laboratory devices for the application of the carrier plate.

It is further an object of the invention to provide a carrier plate and a holding appliance that do not reduce the sample throughput in comparison to carrier plates and holding appliances according to the state of the art.

It is further an object of the invention to provide devices and tools that are matched to the carrier plate.

According to a first aspect of the invention, the carrier plate and/or the holding appliance is configured for the application in one or more devices that take part in an electrophoresis method. In particular, the device is a device for preparing, implementing or evaluating the electrophoresis method.

A carrier plate according to the invention is configured for a use in a laboratory device (hereinafter indicated as "device"), for example in one or more devices as are applied in an electrophoresis method, in particular in a gel-electrophoresis method.

Herein, the carrier plate can be configured explicitly for the application in different devices. For example, apart from the device that is applied in the method step of electrophoresis, the carrier plate can be configured for the application in devices that carry out methods steps that occur prior or subsequently to the electrophoresis.

Independently of whether the laboratory-technological application is electrophoresis or not, the carrier plate can be configured for an application in devices for sample preparation, for example for positioning samples and sample sequences, and in evaluation devices, for example in devices in the field of optical spectroscopy.

The carrier plate can include features that are specific to a laboratory-technological application and to the laboratory devices that are used herein.

A carrier plate that is configured for an application in laboratory devices, in particular devices that are used within an electrophoresis method, can include, for example, a fixation layer for a carrier medium. This fixation layer can be realised, for example, as a carrier film.

In particular, the fixation layer can be hydrophilic and/or be UV-permeable.

In the case of an application of the carrier plate in an electrophoresis method, the molecules that are to be separated by way of electrophoresis can be situated in the carrier medium. The fixation layer can include a binding surface for a gel matrix, in particular for agarose. The fixation layer can be UV-permeable, in particular, in order to stimulate a fluorescing dye by way of UV exposure.

Alternatively or supplementary, the carrier plate can include cavities depending on the laboratory-technological application. The cavities can be rounded (for example, for enzyme-linked immunosorbent assay, ELISA) or V-shaped (for example, for polymerase chain reaction, PCR).

The carrier plate can be of plastic, in particular of a polymer, for example of a PMMA derivative, or of glass.

Furthermore, the carrier plate that is configured for an application in the mentioned laboratory devices can have a standard shape and/or a standard size, in particular according to the American National Standard Institute (ANSI) and in particular according to the specification ANSI SLAS 1-2004 (R2012). In particular, the carrier plate can have the dimensions and tolerances that are listed below point 4 in ANSI SLAS 1-2004 (R2012).

The carrier plate can be smaller than 130 by 86 mm. In particular, the carrier plate can be 127.76±0.5 by 85.48±0.5 mm.

The carrier plate according to the invention includes at least one region with a magnetic characteristic (hereinafter as a rule called "magnetic region") and a positioning appliance. Herein, the magnetic region is designed to fix the carrier plate in the laboratory device and the positioning appliance is designed to guarantee a position of the carrier plate in the device. In particular, the positioning appliance can fix a position of the carrier plate in the laboratory device.

The positioning appliance can be configured such that it sets a desired position of the carrier plate relative to the laboratory device and/or that the carrier plate can assume exclusively a desired position in the laboratory device.

The desired position in particular corresponds to a position that is preferred and/or is optimal for fulfilling the function that is assigned to the laboratory device.

The region with the magnetic characteristic can include a metal or an alloy. In particular the metal can be iron, nickel or cobalt. In particular, the alloys can be alloys which include iron, nickel and/or cobalt.

In an embodiment, the region of the magnetic characteristic includes at least one magnet and the magnetic characteristic of the region corresponds to the magnetic characteristic of the at least one magnet.

In particular, the magnet may be a fixed magnet and/or a permanent magnet.

In an embodiment, the positioning appliance is further designed to guarantee an alignment of the carrier plate in the device. This means that the positioning appliance ensures that the carrier plate is fixable in the device only at a certain alignment.

In particular, the positioning appliance can fix (determine) the alignment of the carrier plate in the laboratory device.

The positioning appliance can be configured such that it fixes (determines) a desired alignment of the carrier plate and/or that the carrier plate can assume exclusively a desired alignment in the laboratory device.

In particular, the positioning appliance can fix (determine) precisely one alignment of the carrier plate for each position of the carrier plate that is fixed (determined) by it.

In particular, the positioning appliance can be configured to guarantee an orientation of the carrier plate in the device.

The positioning appliance can include a rotation lock.

The positioning appliance can include a guide element that is configured to interact with a device-side guide such that a plate, which is fixed in the device, assumes a desired position. In particular, the guide element can be configured such that a manufacturing-inherent variation in the position of the magnetic region and/or in the position of a device-side magnetic holding region does not lead to a variation of the position of the carrier plate in the device. Such a variation in the position of the carrier plate is effected in particular by an interaction of the guide element with the device-side guide.

The position of the carrier plate in the device is given in particular by the position of the carrier plate relative to the device itself. In particular, the position of the carrier plate is given by one or more spacings (distances) of the carrier plate to components of the device and/or by a contact of the carrier plate on one or more contact surfaces or contact points.

The alignment of the carrier plate in the device is given in particular by the alignment of the carrier plate relative to the device itself. In particular, the alignment is given by the position of one or more certain surfaces, sides and/or points of the carrier plate to one or more certain components of the device and/or by a resting contact of one or more certain surfaces, sides and/or points of the carrier plate on one or more certain contact surfaces or contact points.

In particular, the carrier plate is a carrier plate for a laboratory device, wherein the carrier plate has a basic shape, a region with a magnetic characteristic for fixing the carrier plate in the laboratory device and a positioning appliance for the positioning and alignment of the carrier plate in a desired position and in a desired alignment in the laboratory device, characterised in that the basic shape includes at least one symmetry transformation, under which the basic shape is transposed into itself and under which the positioning appliance is not transposed into itself.

In an embodiment, the positioning appliance is not transposed into itself since it includes the region with the magnetic characteristic and this is not transposed into itself by the symmetry transformation.

In particular, a magnetic field, which is produced by the region with the magnetic characteristics, is not symmetrical under the symmetry transformation of the basic shape. For example, a direction of the produced magnet field at a position of the basic shape that is transposed into itself by the symmetry transformation can change.

In an embodiment, the carrier plate includes a flat side, on which samples can be deposited and the region with the magnetic characteristic is magnetised along a direction that runs parallel to the normal of the flat side.

If, for example, one considers a carrier plate that has a rectangular basic shape with two flat sides that are parallel to one another and has a thickness that is significantly smaller than the side lengths of the rectangle forming the basic shape, then the carrier plate is symmetrical with regard to three rotations about 180° (first rotation axis centrally through the flat sides and normal to these, second rotation axis centrally through the short sides of the rectangle, third rotation axis centrally through the long sides of the rectangle). In this case, the position of the carrier plate in the device is given by the position of the rectangle, whereas the alignment of the carrier plate in the device unambiguously differentiates the different symmetrical states which are given by the mentioned rotations.

A carrier plate which is positioned and aligned by way of the positioning appliance in particular can be characterised in that each individual position of a multitude of certain positions on the carrier plate after a fixation of the carrier plate in the device is each reproducibly located at the same position in the device over a plurality of method executions. Apart from spacings to device-side components, this in particular can also include the course of one or more axis of the carrier plate as well as the flat side of the carrier plate which faces a certain device-side component.

In the case of an application of the carrier plate in an electrophoresis method, this can also include that:
  each individual position of a multitude of certain positions on the carrier plate each is reproducibility subjected to the same electromagnetic field, in particular the same field strength and the same field direction, over a plurality of the electrophoresis method.
  a direction, along which the molecules that are to be separated have moved during the electrophoresis method, is unambiguously and reproducibly defined on the carrier plate itself as well as in devices, in which the carrier plate is fixed, over a plurality of the electrophoresis method. In particular, the mentioned direction is given by the orientation of the tail and/or a migration direction of the molecules that are to be separated.

In particular, concerning the mentioned multitude of certain positions, it is the case of sample positions or measuring positions.

The magnetic characteristic of the region on the carrier plate can be such that the carrier plate is fixable in the device in a suspended manner, which is to say without a mechanical support that is applied directly to the carrier plate itself, on a base portion of the device. If the magnetic region includes a magnet, then the magnet or the magnets can have a strength that permits a fixation of the carrier plate on the lower side of a cover of the device.

The strength of the magnetic region or of the magnet that is required for the fixation depends on the magnetic characteristics of a respective magnetic or magnetisable device-side holding region and can be matched to this.

With embodiments with more than one magnetic region for fixing the carrier plate, the strength of the individual magnetic regions that is produced by the magnetic characteristic can be configured such that the carrier plate is fixable in the device in a suspended manner, for example on the lower side of the cover of the device, by the combined fixation effect of the individual magnetic regions.

The device, at whose lower side of the cover the carrier plate is fixable by way of the use of the magnet/magnets, in particular is a electrophoresis device, for example an electrophoresis device as is shown in WO 2016/141495 A2.

Various advantages arise in particular, but not only on using the carrier plate in an electrophoresis device as is shown in WO 2106/141495 A2. For example, a first carrier plate can be fastened to the base of the device and a second carrier plate to the cover of the device, in each case such that the sample positions or measuring positions of the two carrier plates face one another. By way of this, the sample positions or measuring positions on the two carrier plates can be subjected to an almost identical field, since, for example, shielding effects upon the sample positions or measuring positions of the two carrier plates, caused by the carrier plates, are identical.

Furthermore, the carrier plate that is fastened to the base, as well as the carrier plate that is fastened to the cover, can be fixed on a holding appliance according to the invention. The holding appliance can be configured such that the two carrier plates come to lie at a defined position relative to the electrical field. In particular, the device can be configured in a manner such that an almost homogeneous field arises in a region within the device. In this case, the defined positions can be such that the carrier plates are located in the mentioned region with an almost homogeneous field after fixation.

Alternatively or supplementary, the holding appliance can be adjustable, so that the position of a carrier plate can be adjusted.

The application of a magnetic region is indeed quite surprising for an overhanging fixation of the carrier plate, since overhanging fixations are complicated and are not considered, at least not with fluid or flowable samples.

The application of a magnetic region in an electrophoresis device is particularly surprising. On the one hand each magnetic and/or metallic material, which is located in the chamber, influences the electrophoresis. Computations and experiments have now found that it is possible to place one or more magnetic regions for the fixation of the carrier plate, in the chamber, without the field distribution in the region of the samples, which are deposited on the carrier plate, significantly changing. In particular, the field distribution does not change in a way and manner such that a consideration of changes is no longer possible during the evaluation. On the other hand, carrier plates as a rule are not assembled in an overhanging manner in electrophoresis devices, but are placed directly on the base of the chamber, for example amid the use of a platform. It is for these reasons that the question of a holding appliance that is to be simply assembled for suspended carrier plates has hitherto been of a minor importance. In experiments, it has now been found that freely suspended or free-standing carrier plates increase the circulation of the electrophoresis buffer. Furthermore, the omission of the platform has a positive effect on the homogeneity of the electrical field. Both lead to an improvement of the reproducibility of the results of the electrophoresis method.

Hereinafter, in the context of magnetic regions and device-side holding regions, the terms "magnetised along a direction" and "magnetisation direction" are used. Herein, it is the direction of the magnetic field lines on a surface of the magnetic region or of the device-side holding region which is meant by this, the direction being caused by the arrangement of the poles in the magnetic region or in the device-side holding region or by the shape of a coil and the flow direction of the coil current.

If, for example, the magnetic region or the device-side holding region includes a rod-like and/or cylinder-shaped magnet, wherein the south pole of the magnet runs parallel to a first surface of the (holding) region or forms this first surface and wherein the north pole of the magnet runs parallel to a second surface of the (holding) region or forms this second surface, then the direction along which the region is magnetised or the magnetisation direction of the holding region runs along an axis that connects the two poles of the rod-shaped and/or cylinder-shaped magnet. In the case of the first surface (south pole), the direction, along which the region is magnetised or the magnetisation direction of the holding region runs towards the first surface. In the case of the second surface (north pole), the direction along which the region is magnetised or the magnetisation direction of the holding region runs away from the second surface.

The use of the terms "magnetised along a direction" and "magnetisation direction" is valid independently of whether the mentioned region includes a permanent magnet or whether the region is magnetised in the course of the fixation of the carrier plate. Furthermore, these terms are to be applied accordingly if the magnetic characteristics of the magnetic region or of the device-side region are generated by a coil.

If, for example, the magnetic region or the device-side holding region includes a coil with a longitudinal axis, then the direction, along which the region is magnetised or the magnetisation direction of the holding region runs along the longitudinal axis. As to whether the direction points to a surface that runs parallel to a coil end or away from it, depends on the direction, in which the current runs through the coil.

In an embodiment, the carrier plate includes at least two magnetic regions, wherein a first magnetic region is magnetised along a first direction and a second magnetic region is magnetised along a second direction. The second direction differs from the first direction.

The positioning appliance can include the at least two magnetic regions, wherein the first direction is matched to a magnetisation direction of a first device-side holding region and the second direction to a magnetisation direction of a second device-side holding region.

In particular, the first direction can be matched to the magnetisation direction of the first device-side holding region and the second direction to the magnetisation direction of the second device-side holding region, such that the first magnetic region and the first device-side holding region and such that the second magnetic region and the second device-side holding region attract in the alignment and positioning of the carrier plate that are desired for the method step and the first magnetic region and the second device-side holding region and/or the second magnetic region and the first device-side holding region repel in every alignment and positioning that deviate from the desired alignment and positioning of the carrier plate. A fixation of the carrier plate in the device then only takes place when the first and the second magnetic regions come to lie on the respective device-side holding regions and a certain alignment of the carrier plate, including the orientation of the flat sides of the carrier plate is present, by which means the positioning appliance that includes the first and the second magnetic region is designed to guarantee the fixation of the carrier plate at a certain positioning and alignment of this.

In particular, the first direction and the second direction can run parallel to the normal of the flat side, on which the samples can be deposited.

The magnetic characteristics of the mentioned device-side holding regions can be caused by magnets or coils, which are arranged at the device side.

The mentioned device-side holding regions can be holding regions of a holding appliance, which is likewise claimed.

In an embodiment, the carrier plate includes at least two second magnetic regions and a basic shape that has at least one symmetry transformation, under which the basic shape is transposed into itself and under which the positioning appliance is not transposed into itself, wherein the positions of the second magnetic regions on the carrier plate are arranged such that these positions are not transposed into themselves under the symmetry transformation. By way of this, one can effect the carrier plate experiencing a force on attachment, the force perceivably rotating and/or translatorily displacing the carrier plate.

Such an arrangement of two second magnetic regions can be present additionally to a change of the direction of the magnetic field that is produced by one or more magnetic regions, the change being effected by the symmetry transformation. The latter can lead to a repelling force arising between one or more magnetic regions and the device-side holding regions that correspond thereto.

In an embodiment, the positioning appliance includes a positioning element that is designed to unambiguously fix (determine) the alignment and position of the carrier plate in the device.

In particular, the positioning element can be a projection, for example a pin, a recess, for example an indentation, a beveling or a variation in an otherwise familiar shape of the carrier element, and/or an alignment marking.

The positioning element can be configured to ensure the alignment and position of the carrier plate in the device via an interaction with a device-side positioning element. In particular, the interaction can be based on the production of an optical impression and/or on a mechanical and/or magnetic interaction.

The device-side positioning element can be part of the likewise claimed holding appliance.

The positioning element can be part of the positioning appliance additionally to one or more magnetic regions.

In an embodiment, the carrier plate includes an inner surface, an edge region and markings. In particular, the markings are designed to unambiguously identify a multitude of sample positions on the carrier plate, in particular in its inner surface.

Concerning the sample positions, these in particular are positions, at which the samples, for example the molecules that are brought into the carrier medium and that are to be separated by way of electrophoresis, are deposited on the carrier plate.

In particular, these sample positions can be reproducible by the carrier plate in their position in one or more devices that participate in the electrophoresis method as well as in their alignment to the respective device and over several devices.

In particular, the sample positions can be reproducible in their position and alignment over several devices such that the use of a plurality of different devices for carrying out a laboratory-technological method has no influence on the reproducibility and reliability of the obtained measurement results.

The sample positions can be matched to device-side positions. In particular, the sample positions can coincide with these device-side positions, should the carrier plate be located in the device in the alignment and position that are given by the positioning appliance. One can further envisage characteristics of the device being determined and/or calibrated at the device-side positions.

For example, the field strength and/or the field direction of a field that is produced by a device can be determined at the device-side positions and variations that occur at the sample positions can be taken into account in the evaluation of the measurement data. For this, the device can include measuring electrodes and measurement electronics.

The sample positions can be realised as a two-dimensional raster, in particular with a first marking series along the first axis and a second marking series along a second axis.

The first and the second axis can be perpendicular to one another.

In an embodiment, the markings and the magnetic region or the markings and the magnetic regions, as well as—if present—the positioning element are arranged in the edge region.

In an embodiment, the carrier plate includes an object carrier for spectroscopic applications.

The spectroscopic applications, in particular, are applications in the field of optical spectroscopy, in particular fluorescence spectroscopy.

The object carrier can alternatively or supplementarily be suitable for applications of optical microscopy.

The object carrier in particular can be configured for spectroscopy and/or microscopy methods that include an illumination according to a reflected light method.

In particular, the object carrier can have a standard shape, or standard size, for the use in the mentioned spectroscopic and/or microscopic applications. For example, the object carrier can have a size according to DIN ISO 8037-1, which is to say 76 by 26 mm.

The object carrier can be manufactured of glass or of a material other than glass. In particular, the object carrier can be manufactured of plastic, in particular acrylic glass, PMMA, plexiglass or polycarbonate.

The object carrier can include an initially mentioned fixation layer.

In an embodiment, the carrier plate includes the already mentioned inner surface and the already mentioned edge region, wherein the object carrier is arranged in a region of the inner surface and is connected to the edge region via a predetermined breaking point.

By way of this, the object carrier can be released out of the carrier plate in a simple manner, by which means it becomes possible to use an object carrier that is suitable for spectroscopy and/or optical evaluation, in a laboratory device that is not configured for the applications of such an object carrier. For example, the object carrier can be applied in a direct manner in electrophoresis or in sample preparation.

The carrier plate in its inner region can include one or more, for example two, three or more object carriers. These can be connected to one another via predetermined breaking points, wherein it is conceivable for one or more object carriers not to be connected to the edge region of the carrier plate in a direct manner via a predetermined breaking point.

In particular, in the embodiment with an object carrier in the region of the inner surface, but also in other embodiments, the edge region can have a shape that is not closed in itself. This means that the edge region does not need to be continuous.

For example, the edge region can be adjacent to only one or two sides of an object carrier. The two sides, to which the edge region is adjacent, are preferably not the flat sides of the object carrier.

Particularly in embodiments, in which the carrier plate includes only one object carrier, magnetic regions, which are arranged in the edge region, can be magnetised along the same direction. This can also be the case if the carrier plate has no magnetic region that is not arranged in the edge region. An increased positioning freedom within the device for the carrier plate with an object carrier, or—more generally—for carrier plates having dimensions that are smaller than those of a standard carrier plate can be achieved by way of such a design of the magnetic regions. The correct alignment of the carrier plate can continue to be achieved via a positioning element.

Embodiments, concerning which the magnetic region or regions are arranged on the separable edge region, further have the advantage that the medium that carries the samples no longer has any magnetic regions after separating off the edge region, which is to say as a rule after the electrophoresis.

One advantage of a carrier plate of the previously described type that includes an object carrier in a standard size is that not only can one forgo a retrofitting of existing devices that are used for optical and/or spectroscopic evaluations, but also that their application for evaluation is even simplified. In particular, commercially available microscopes that are applied as standard in laboratories can be used for evaluation without retrofitting.

Device-side holding regions that are matched to a carrier plate, which includes an object carrier can be part of a holding appliance as it is likewise claimed.

A carrier plate according to one of the previously described embodiments can further be configured such that the carrier plates are stackable. In particular, the directions along which the magnetic region or regions of the carrier plate are magnetised, possibly in combination with the positioning element, can be configured such that the carrier plates are stackable to one another in precisely one relative position and alignment. In particular, this relative position and alignment is characterised in that each magnetic region of a stacked carrier plate is attracted by a magnetic region of a carrier plate, which is situated thereabove or therebelow. In particular, this relative position and alignment is characterised in that a certain flat side of the carrier plate runs parallel to a certain flat side of the carrier plate, which is situated thereabove or therebelow.

A carrier plate includes two flats sides, which are essentially parallel to one another. These are hereinafter indicated as upper side and lower side, wherein it is the upper side, on which the samples are deposited or have been deposited, depending on the method step. In other words: the upper side corresponds to the sample side of the carrier plate independently of the alignment of the carrier plate.

The carrier plate can further be configured for the carrier plate to protect the upper side or sample side of a carrier plate, which is stacked on a lower side. In particular, the carrier plate can be stackable such that a multitude of carrier plates results in a compact, stable and easily transportable formation.

Alternatively, the carrier plate can be configured such that several carrier plates in a stacked state can be brought into a laboratory device, for example into an electrophoresis device and fixed in this.

The invention also relates to a holding appliance. A holding appliance according to the invention is configured for the fixation of a carrier plate according to one of the previously described embodiments in a laboratory device, for example in a laboratory device that is applied within one of the aforementioned laboratory-technological applications. In particular, the holding appliance is configured for the fixation of the carrier plate in a desired position and in a desired alignment.

In particular, the holding appliance is configured for the fixation of the carrier plate in at least one device that is used within an electrophoresis method, for example in one or more of the previously mentioned devices.

The holding appliance includes a holding region, in which the holding appliance is magnetic or magnetisable, wherein the mentioned holding region is configured to fix the carrier plate in the device.

Furthermore, the holding appliance is configured to be able to be assembled in the laboratory device, in particular in at least one device that is used within the electrophoresis method.

Furthermore, the holding appliance can be configured, whilst interacting with the positioning appliance of the carrier plate, to guarantee the positioning and possibly the alignment of the carrier plate in the device.

The holding appliance can form a counter-piece to the positioning appliance of the carrier plate and/or form such a counter-piece.

In particular, the number and arrangement of magnetic or magnetisable holding regions on the holding appliance as well as their magnetisation directions in a magnetised state can be matched to the number and arrangement of magnetic regions on the carrier plate as well as the directions, along which the magnetic regions of the carrier plate are magnetised.

For example, the holding appliance can include a first holding region with a first magnetisation direction and a second holding region with a second magnetisation direction, wherein the direction of the magnetisation of the first magnetic region of the carrier plate ("first direction") is matched to the first magnetisation direction and the direction of the magnetisation of the second magnetic region of the carrier plate ("second direction") is matched to the second magnetisation direction.

The holding appliance can include two or more sets of magnetic or magnetisable holding regions that are specific to a certain carrier plate type, wherein one set differs from another set in at least one magnetic or magnetisable holding region. A carrier plate type is given, for example, by the dimensions of the carrier plate, the number and arrangement of the magnetic regions as well as the directions, along which the magnetic regions are magnetised.

The holding appliance can include, for example, a magnetic or magnetisable holding region, or a set of such holding regions, which is configured for the fixation, positioning and possibly alignment of a carrier plate without an object carrier, and a magnetic or magnetisable holding region that is different therefrom or a set of such holding regions which is different therefrom, which is configured for the fixation, positioning and possibly alignment of a carrier plate with the object carrier.

The magnetic or magnetisable holding region of the holding appliance can include a holding appliance magnet or a coil, which produces the magnetic characteristics of the mentioned holding region.

Embodiments with a coil can further include a control element, via which a user can control the magnetisation of the mentioned holding region. In particular, the user can reduce the magnetisation, in order to permit a simple release of the carrier plate.

Alternatively or supplementarily, the user can match the strength of the magnetic interaction with regions on the carrier plate, in particular the number and the characteristics of the magnetic regions.

Alternatively or supplementarily, the direction of the magnetisation of the mentioned holding region can be matched to the carrier plate, in particular to the type of carrier plate. For example, the direction of the magnetisation which is necessary for the fixation, positioning and alignment can depend on whether the carrier plate includes a positioning element and the nature of the positioning element and/or whether it is a carrier plate that includes an object carrier. Concerning a carrier plate that includes an object carrier, it can be necessary for the mentioned holding region to have a certain direction of the magnetisation, in order to ensure a high positioning freedom of the carrier plate with the object carrier.

The holding appliance can further include at least one of the following features:

A guide that defines a desired position of a carrier plate, which is fixed in the laboratory device via the holding appliance. In particular, the guide is configured to minimise the effects of manufacturing influences upon the desired position. For example, the guide can be configured to compensate differences in the position of the magnetic regions that are inherent of the manufacture, differences in the position of the magnetic holding regions that are inherent of the manufacture, a distortion of the magnetic regions and/or a distortion of the magnetic holding regions.

For example, the guide can be a recess that interacts with the guide element of the carrier plate.

The guide can be configured such that it engages on an edging of the carrier plate. For example, the edging can include an end that is away from the lower side of the carrier plate, wherein this end includes an outwardly (which is to say away from the carrier plate) lying edge and/or an inwardly lying edge. The guide can engage on the outer-lying edge and/or the inner-lying edge. Furthermore, the desired position of the carrier plate can be defined by a position of one or both mentioned edges.

A spacer that is configured to bring a carrier plate, which is fixed onto the device via the holding appliance, into a certain position in the device.

If the laboratory device is an electrophoresis device, then the certain position can be dependent in particular on the field distribution which is produced by the device. The certain position in the device is then to be understood as a certain position in the electrical field.

An attachment of the spacer on the holding appliance has the advantage that the carrier plate itself can include no such spacer, by which means this can be applied in different laboratory devices more simply. Furthermore, the carrier plates are stackable and transportable in a simpler and more compact manner by way of this.

Means for fastening the holding appliance on the device, for example assembly openings or assembly bores, guide rails, latching appliances, etc.

One or more positioning elements, wherein the one or the positioning elements can correspond to the aforementioned device-side positioning element or elements, which are assembled on the device via the holding appliance.

In an embodiment, the holding appliance includes a plurality of holding regions, wherein at least one holding region is arranged relative to the other holding regions in a manner such that an exact transposition of the positions of the holding regions under a symmetry transformation is rendered impossible.

In particular, the exact transposition of the positions of the holding regions under the symmetry transformation can be rendered impossible since two holding regions are pushed out of their symmetrical positions along a straight line which connects these holding regions.

The mentioned straight line can be along an axis which itself is a symmetry axis for a symmetry transformation which transposes the positions of the holding regions into one another.

The invention moreover relates to an appliance, which includes a carrier plate according to one of the previously described embodiments and a holding appliance according to one of the previously described embodiments, wherein the magnetic characteristic of the holding region is matched to the magnetic characteristic of the region with the magnetic characteristic such that the carrier plate can only be fixed relative to the holding appliance in a desired position and desired alignment.

In particular, the magnetic characteristic of the holding region and the magnetic characteristic of the region with the magnetic characteristic are matched to one another such that only attracting magnetic forces are produced between the carrier plate and the holding appliance when the carrier plate is situated in the desired position and desired alignment.

The invention further relates to a laboratory device that includes a holding appliance in one of the previously described embodiments.

In particular, the laboratory device is a device that can be applied in an electrophoresis method.

In an embodiment, the device is an electrophoresis device, in particular an electrophoresis device as is shown in WO 2016/141495 A2 for example. As already specified, in particular, as already specified with reference to the electrophoresis device that is shown in WO 2016/141495 A2, various advantageous arise from an application of a carrier plate in one of the mentioned embodiments and/or in the holding appliance in one of the mentioned embodiments, in an electrophoresis device.

In an embodiment, the electrophoresis device can include a plurality of measuring electrodes and measurement electronics, wherein the measuring electrodes are arranged in the electrophoresis device such that the strength and the direction of an electrical field that is produced by the electrophoresis device can be measured and/or computed at different positions in the device amid the use of measurement electronics.

The positions, at which the strength and the direction of the produced electrical field are estimated in particular are positions that are suitable for determining, for example computing the field strength and/or the field direction at several or all sample positions of a carrier plate which is fixed in the device. The mentioned positions can be the previously described device-side positions, to which the sample positions on the carrier plate can be matched.

The measuring electronics can further be configured to control the field strength and/or the field direction which prevail at the different positions, such that the field strength and/or field direction comes to lie in a defined range about a desired value (setpoint).

In an embodiment, the device is an evaluation device, in particular an evaluation device of optical spectroscopy.

In an embodiment, the device is a device for sample preparation.

In particular, it is a device for sample preparation which is configured to permit a positionally accurate depositing of the samples on the carrier plate.

In an embodiment of the device for sample preparation, this includes pipetting positions which are integrated into the pipetting block. By way of this, the device can be free of a pipetting frame.

In particular, the pipetting positions are the previously described sample positions.

The pipetting positions can include deepenings in a flat side of the pipetting block.

In an embodiment, the pipetting block includes a first flat side that includes a first set of pipetting positions, and a second flat side that includes a second set of pipetting positions. The first set of pipetting positions is configured for a first sample volume and the second set of pipetting positions is configured for a second sample volume.

The first and the second set of pipetting positions can include deepenings, which are configured for different sample volumes. The arrangement of the pipetting positions of the first set and the arrangement of the pipetting positions of the second set can be matched to the different sample volumes. In particular, the mentioned arrangements can differ in the distances between adjacent pipetting positions of a set of pipetting positions.

Supplementarily to any one of the previously described embodiments of the device for sample preparation, the same can include at least one of the following features:

The device for sample preparation can include a pipetting block.

The pipetting block can be a block of aluminium.

The pipetting block can include an active cooling and/or can be configured to be cooled.

The pipetting block can include positioning markings and/or lines which are arranged into a positioning grid.

BRIEF DESCRIPTION OF THE DRAWINGS

The subject-matter of the invention is hereinafter explained in more detail by way of preferred embodiment examples that are represented in the accompanying drawing. In each case in a schematic manner are shown in:

FIGS. 9-12 a holding appliance, concerning which holding elements are arranged eccentrically relative to the magnetic regions of the carrier plate.

DETAILED DESCRIPTION OF THE INVENTION

Figure 1:
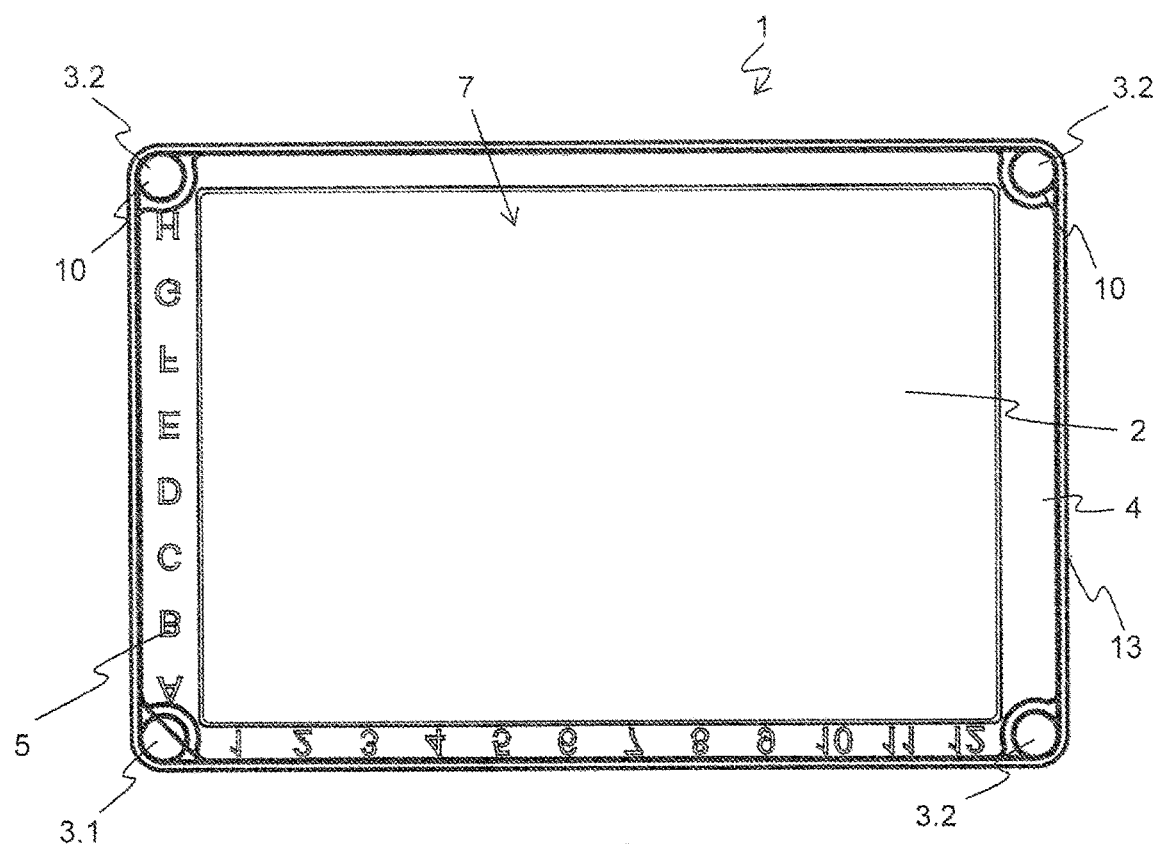
FIG. 1 the lower side of a carrier plate.

Basically, in the figures the same or analogous parts are provided with the same reference numerals.

FIG. 1 shows the lower side 7 of a carrier plate 1. The lower side 7 is that flat side of the carrier plate, onto which no samples are deposited. As a rule, the lower side is that flat side that faces the device after a fixation of the carrier plate 1 in a device, which is to say has no or very small distances to a device-side flat side and/or to a device-side holding appliance 20.

The shown carrier plate 1 includes an inner surface 2, and edge region 4 and four magnets 3, which define four regions with magnetic characteristics. The magnets are sunk from the lower side 7 into recesses 10 in the edge region 4 of the carrier plate 1. The magnets are orientated in the recesses 10 such that the directions of their magnetisations run parallel to an axis that is normal to the flat sides of the carrier plate 1.

The four magnets define or are part of a positioning appliance by way of a first magnet 3.1 being magnetised along a first direction, whereas the other three magnets 3.2 are magnetised along a second direction, which is opposite to the first direction. A guide element, for example in the form of an edging 13, and/or a positioning element, for example in the form of a pin or a recess, can be further parts of the positioning appliance.

A device-side positioning appliance, which is matched to this magnetisation of the four magnets, for example in the form of a holding appliance 20, includes four magnetic or magnetisable holding regions, whose magnetisation directions are configured such that they are normal to a plane, in which the carrier plate 1 is attached in the device. Of the four holding regions, a first holding region has a first magnetisation direction and the other three holding regions have a second magnetisation direction, which is opposite to the first magnetisation direction.

The first magnetisation direction is herein selected such that an attracting effect between the first holding region and the first magnet 3.1 only arises when the carrier plate 1 is orientated with the lower side 7 in the direction of the device and/or of the device-side holding appliance 20.

Herein, the magnetic or magnetisable holding regions are arranged, in particular spaced from one another, such that they can be brought into congruency with the four magnets.

Due to the selection of the first and second direction, of the first and second magnetisation direction, and of the arrangement of magnets and the magnetic holding regions, there is precisely one alignment and orientation of the carrier plate 1, in which simultaneously in each case one of the four holding regions exerts an attracting effect on one of the magnets.

Figure 2:
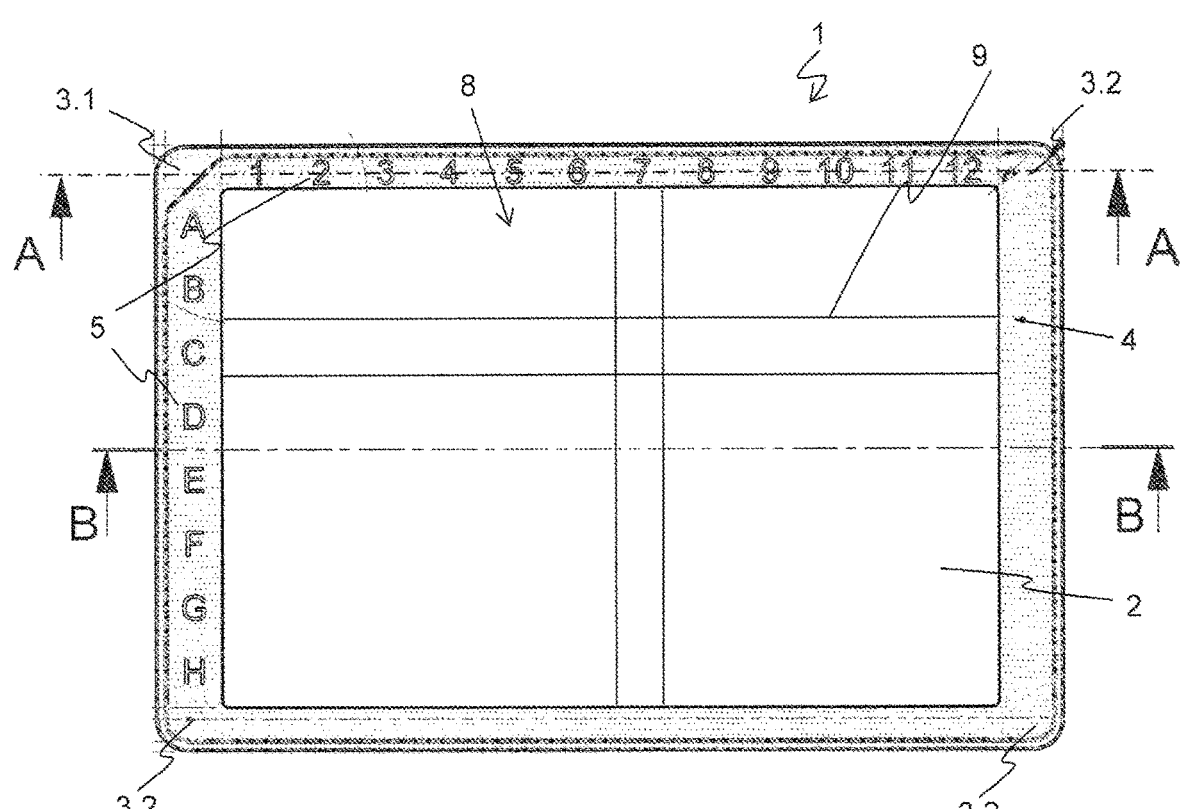
FIG. 2 the upper side of the carrier plate according to FIG. 1.

FIG. 2 shows the upper side 8 of the carrier plate 1. The upper side 8 is that flat side of the carrier plate that corresponds to the sample side, which is to say that flat side, on which the samples are attached.

In the shown embodiment, the recesses 10, in which the magnets 3.1/3.2 are sunk, are not continuous from one flat side to the other, which is why the magnets, depending on the nature of the edge region 4, are not visible from the upper side 8 of the carrier plate 1.

The edge region 4 includes markings 5. These can be arranged in the extension of lines 9 or between those lines 9 that extend over the inner surface 2 of the carrier plate.

The markings 5, possibly in combination with the lines 9, are arranged such that a multitude of positions in the inner surface 2 is unambiguously defined by the setting of two markings.

On the upper side 8, the inner surface 2 can include a film (foil) that is configured to prevent an undesired flowing-away of a deposited sample, in particular of a carrier medium, in which molecules which are to be separated by way of electrophoresis are located.

The edge region 4 or parts thereof can include a writable surface.

Figure 3:
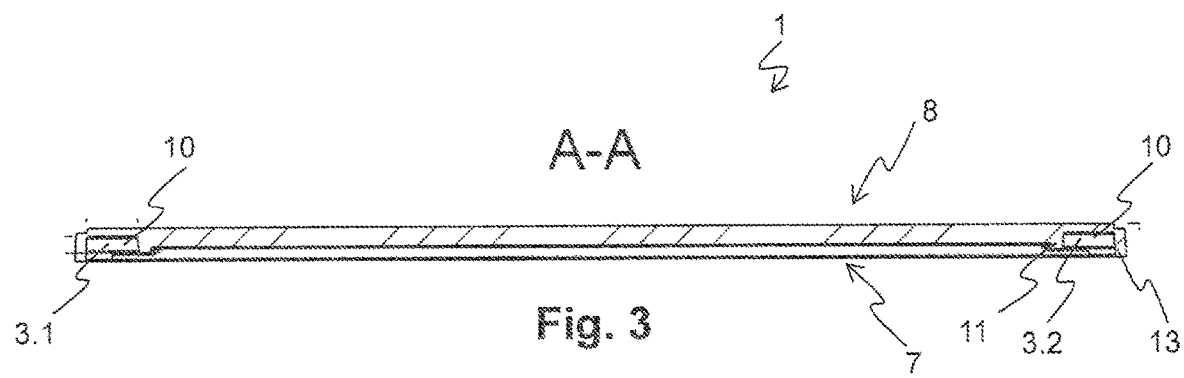
FIG. 3 a section along the axis A-A according to FIG. 2.

FIG. 3 shows a cross section along the line A-A which is drawn in FIG. 2, which is to say a cross section through the edge region 4 of the carrier plate 1 is shown.

The carrier plate 1 on the lower side 7 includes projections 11 that include the recess 10 for the magnet 3.1/3.2, as well as the edging 13.

The projections 11 and the edging 13, along an axis perpendicular to the flat sides of the carrier plate 1 are dimensioned such that the edging 13 extends further along this axis than the projections, so that the edging 13 ensures a certain distance to a counter-piece should the carrier plate 1 be fixed on the mentioned counter-piece by the magnets 3.1/3.2.

In particular, the counter-piece can be the device or the holding appliance 20.

However, the counter-piece can also be a further carrier plate. In this case, the described directions, along which the magnets 3.1/3.2 are magnetised, ensure that the lower side of the further carrier plate faces the upper side of the carrier plate 1 (or vice-versa) and that the carrier plates are fixed on one another. The projections 11 are designed such that the lower side 7 of the further carrier plate 7 does not contact the upper side 8 and, in particular, samples of the carrier plate 1 that are located thereon.

Consequently, the carrier plates 1 are very well stackable, wherein the samples are protected given stacked carrier plates 1.

Figure 4:
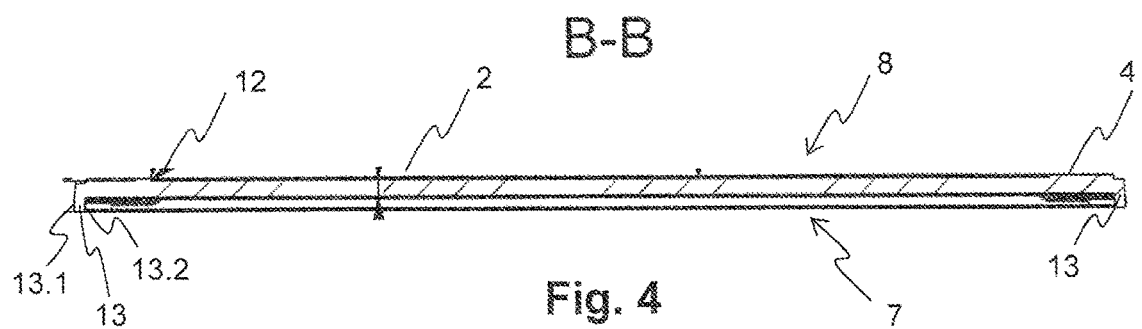
FIG. 4 a section along the axis B-B according to FIG. 2.

FIG. 4 shows a cross section along the line B-B which is drawn in FIG. 2.

In the shown embodiment, the edging 13 is arranged on the lower side 7 of the carrier plate 1. The edging 13 includes an outer-lying edge 13.1 and an inner-lying edge 13.2. In the shown embodiment, both edges are configured as a guide element, which means they form a counter-bearing, for example for a gripper, and/or a counter-piece for a device-side guide and/or one or more contact points for a device-side positioning appliance.

The edging 13, which is shown in FIGS. 1 and 2, is a continuous edging. This is particularly advantageous if the carrier plate 1 is configured to be a cover for a further carrier plate, wherein this cover protects the upper side 8 of the further carrier plate when the carrier plate is fixed on the further carrier plate with the help of magnets.

However, a continuous edging is not a precondition, in order to fulfil one or more of the main tasks of the edging 13. In particular, the definition of a distance of the lower side 7 to a surface, on which the carrier plate 1 lies, and the function as a guide element, belong to the main tasks.

In the shown embodiment, the upper side 8 of the carrier plate 1 includes a deepening 12. The inner surface 2 is arranged in this deepening 12, whereas the edge region 4 is arranged outside the deepening 12 and edges this.

A flowing-away of samples, which have been attached on the inner surface 2, out of the inner surface 2 into the edge region 4 and beyond is prevented by way of the presence of the deepening 12.

Figure 5:
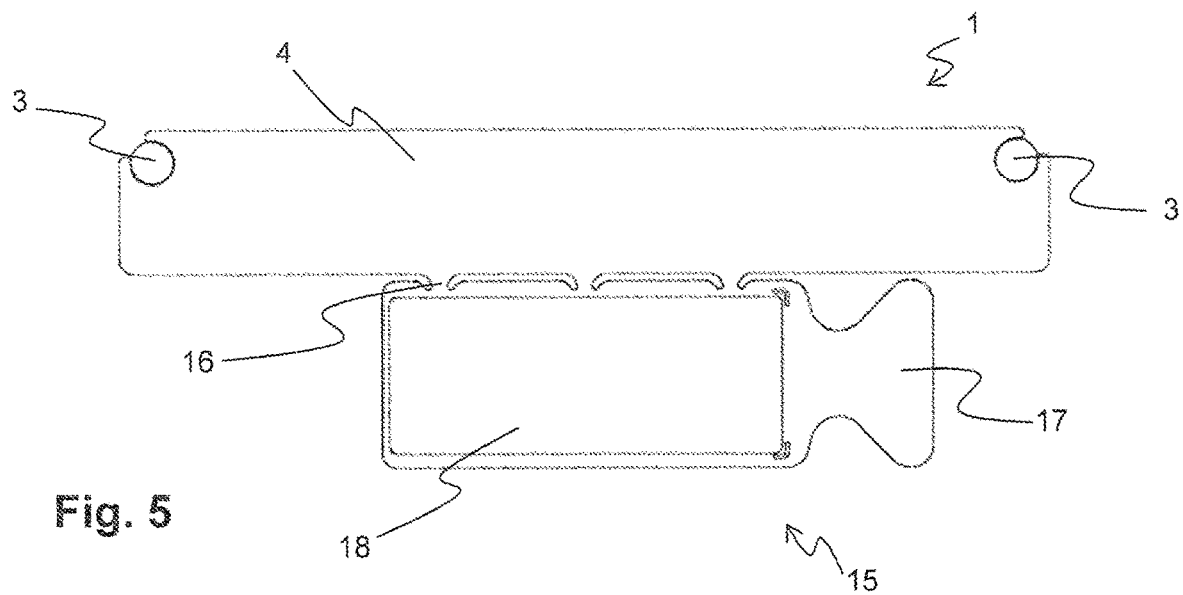
FIG. 5 the lower side of a carrier plate which includes an object carrier.

FIG. 5 shows a carrier plate 1, which includes an object carrier 15. What is shown is the upper side of the mentioned carrier plate 1.

In the shown embodiment, the carrier plate 1 includes only one object carrier 15. This is connected to the edge region 4 of the carrier plate 1, wherein the connection is designed such that predetermined breaking points 16 are present.

The predetermined breaking points 16 are configured such that the object carrier 15 is connected to the edge region 4 in an adequately rigid manner, which is to say the object carrier 15 and the edge region 4 form a unit that, in particular, is itself rigid enough for the attachment, processing and storage of the samples as well as for their application in the laboratory device. On the other hand, the predetermined breaking points 16 are configured such that a simple release of the object carrier 15 from the edge region 4 by the user is possible, for example by way of folding away or creasing the object carrier 15 relative to the edge region.

Another number and arrangement of connections between the edge region 4 and the object carrier 15 is conceivable.

It is also conceivable for the object carrier 15 to be directly or indirectly connected to different parts of the edge region 14, for example parts that are at right angles to one another or lie opposite one another.

In the embodiment according to FIG. 5, the recess 10, in which the magnets are sunk, is continuous from one side of the edge region to the opposite side of the edge region.

The magnets 3 can be magnetised in the same or in the opposite direction depending on the configuration of the magnetisation direction of the device-side magnetic holding regions.

Furthermore, the object carrier 15 in the embodiment which is shown in FIG. 5 includes a fixation layer in the form of a carrier film 18 and an optional grip surface 17. As mentioned initially, such fixation layers are present in particular with carrier plates 1 and object carriers 15 which are used in electrophoresis.

An indirect connection between the edge region 4 and the object carrier 15 can be realised, in particular, via a further object carrier that is likewise located in the inner surface 2 of the carrier element 1. This is shown schematically in FIG. 6, wherein the lower side 7 of the carrier element 1 is shown.

A carrier plate 1, which includes an object carrier 15, can also include several object carriers 15. Herein, two object carriers can be separably connected to one another. In particular, the separable connection can be connection that is analogous to the previously described connection with predetermined breaking points 16 between an object carrier 15 and the edge region 4.

In the shown embodiment, the magnets 3/3.1/3.2 are sunk into the edge region 4.

Figure 6:
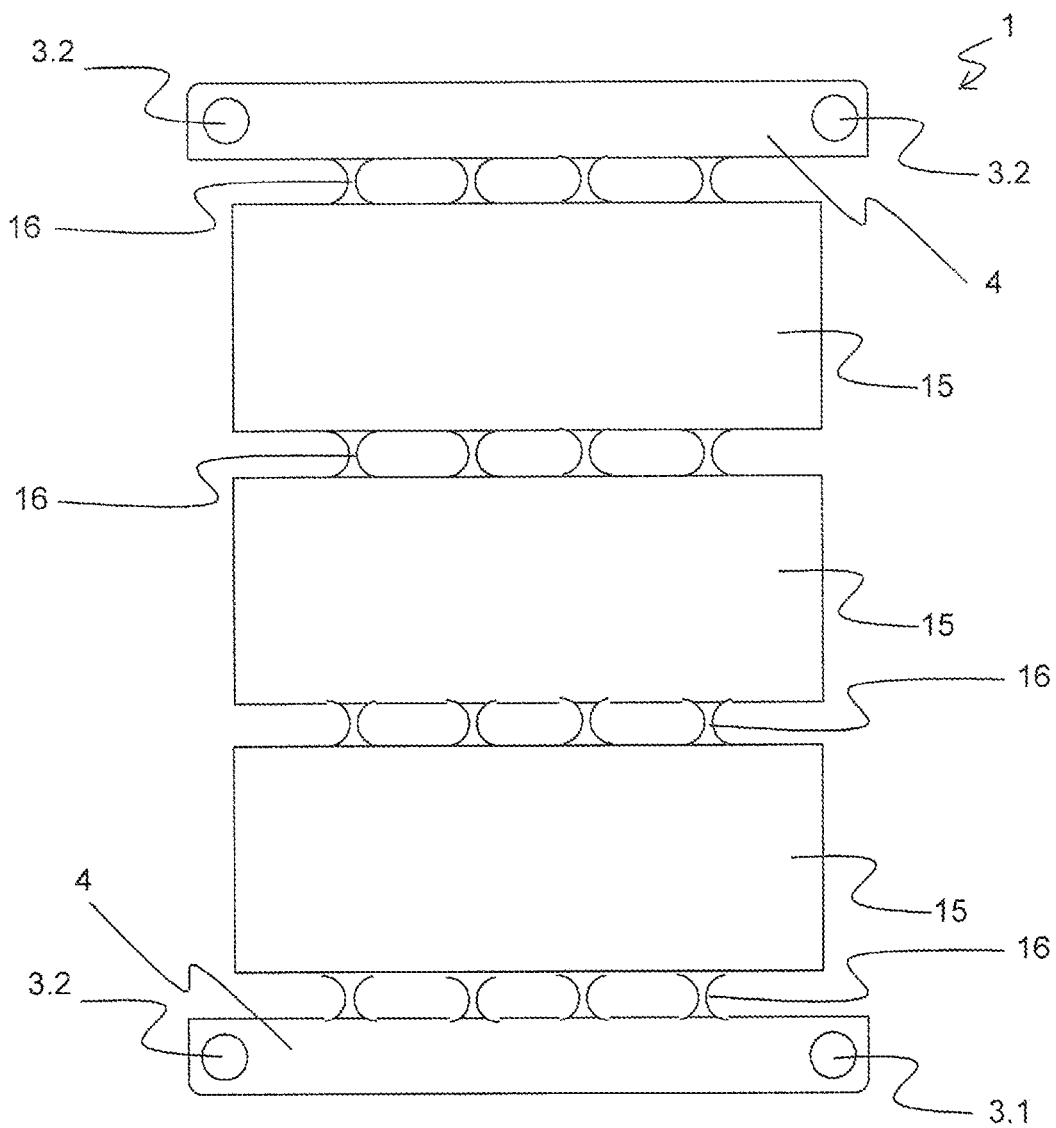
FIG. 6 the lower side of a carrier plate which includes a plurality of object carriers.

In the embodiments according to FIGS. 5 and 6, the lower side 7 includes no projections 11. Instead, the thickness of the carrier plate 1 in the edge region 4 is selected such that the magnets 3/3.1/3.2 can be completely received between the flat sides of the carrier plate 1.

It is conceivable for the edge regions 4 of the carrier plate with one or more object carriers 15 to also include an edging 13 and/or a projection 11, so that in particular the previously described functions of a guide element and/or mentioned stackability are realised.

Figure 7:
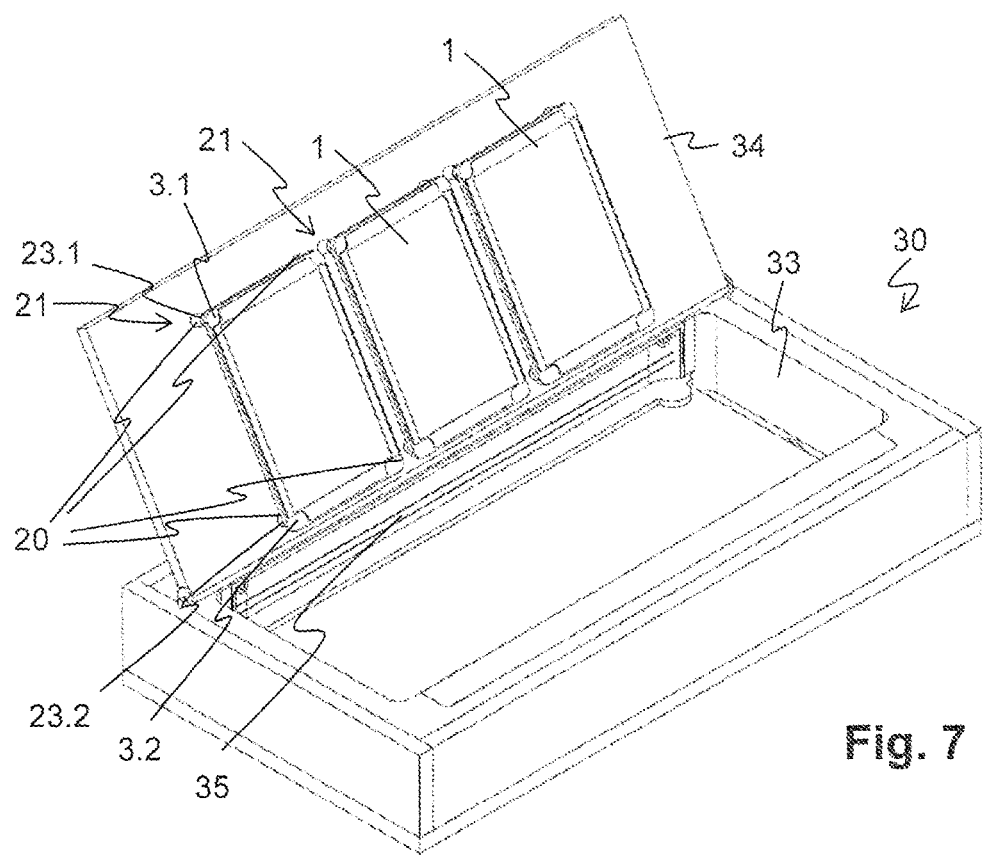
FIG. 7 an electrophoresis device with fixed carrier plates.

A device 30 that takes part in an electrophoresis method and into which three carrier plates are fixed is shown in FIG. 7. The shown device is a gel-electrophoresis device 30 as is described in detail in WO 2016/141495 A2.

The gel-electrophoresis device 30 includes electrodes 35 including a first electrode 35.1 and a second electrode 35.2, a chamber 33 and a function cover 34.

In the shown embodiment, the carrier plates 1 are fixed on the function cover 34. For this, the function cover includes a holding appliance 20.

The shown holding appliance 20 is present per carrier plate 1 of four holding elements 21, the carrier plate to be fixed. The holding elements 21 are fixable on the function cover 34, wherein the positions of their fixation are matched to the positions of the magnets 3.1/3.2 of the carrier plate 1.

Alternative realisations of the holding appliance 20 are conceivable. In particular, the holding appliance 20 can be of one piece and include a number of holding elements 21, which is matched to the number of magnets 3.1/3.2 of the carrier plate 1 or of the carrier plates 1.

The holding appliance 20 which is shown in FIG. 7 is configured for a carrier plate 1 according to the FIGS. 1-4. For this, three of the four holding elements 21 include second device-side magnets 23.2 whose magnetisation directions are matched to the direction of the magnetisations of the three second magnets 3.2 of the carrier plate 1, whereas the fourth holding element 21 includes a first, device-side magnet 23.1 whose magnetisation direction is matched to the direction of the magnetisation of the first magnet 3.1 of the carrier plate 1. The device-side magnets 23.1/23.2 are matched to the magnets 3.1/3.2 of the carrier plate 1 such that the carrier plate can only be fixed on the function cover 34 in a defined position and alignment.

The mentioned defined position and alignment in particular are characterised in that the upper side 8 is directed towards the chamber 33. Furthermore, the position and alignment are characterised in that a position on the upper side 8, the position being unambiguously identifiable by the markings 5, comes to lie at the same position in the chamber 33 in a reproducible manner.

The holding appliance 20 or the holding elements 21 are dimensioned such that given a closed function cover 34, the upper side 8 comes to lie in a region, in which the field that is produced by the electrodes 35 is optimised for the electrophoresis. In the shown embodiment, the holding elements 21 therefore include spacers 22.

Figure 8:
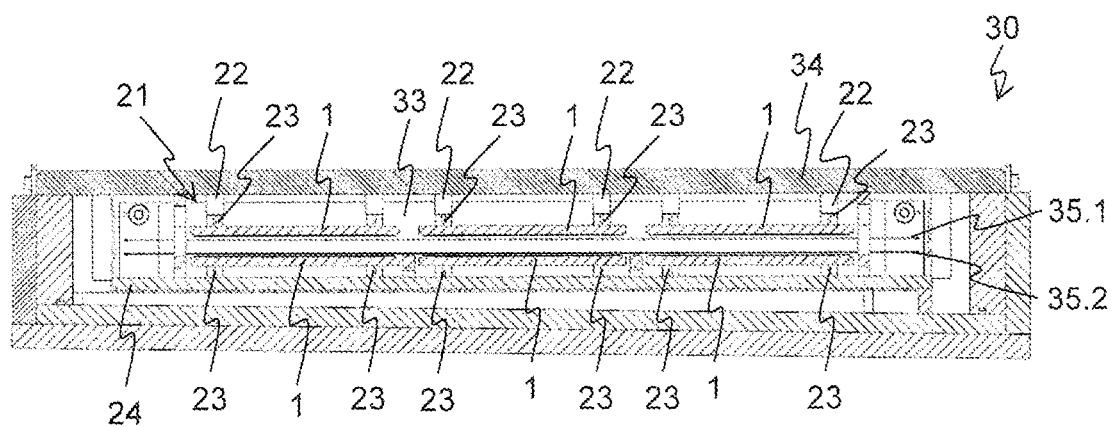
FIG. 8 a cross-sectional view of a electrophoresis device with fixed carrier plates.

FIG. 8 shows a schematic cross section through a gel-electrophoresis device 30 as is described in detail in WO 2016/141495 A2.

In the shown embodiment, three carrier plates 1 are fixed on the function cover 34 as is shown in FIG. 7. For this, the function cover 34 includes the previously described holding appliance 20, including holding elements 21, spacers 22 and device-side magnets 23.1/23.2.

In the embodiment shown in FIG. 8, furthermore three carrier plates 1 are fixed on the base of the chamber 33. For this, the gel-electrophoresis device 30 includes a carrier element 24 that is removable from the chamber, for example, via carrier grips, in order to install and remove the carrier plates 1. The carrier element 24 is described in detail in WO 2016/141495 A2.

The carrier element 24 for its part can include a rotation lock, for example by way of the carrier element 24 including a recess or opening that is matched to a projection on the base of the chamber 33.

The carrier element 24 includes a holding appliance 20. In the shown embodiment, the holding appliance 20 of the carrier element 24 has no spacer 22 since the carrier element 24 is configured such that the carrier plates 1 come to lie in the desired region of the chamber 33 when the carrier plates 1 are fixed correctly in position and alignment via the device-side magnets 23.1/23.2 and the magnet 3.1/3.2 of the carrier plates 1.

The FIGS. 9-12 show three holding appliances 20, on which a carrier plate 1 is fixed in each case. Each holding appliance 20 includes four holding elements 21. The shown holding appliances 20 are integrated into the carrier element 24 or into the function cover 34. For this, in the shown embodiment the holding elements 21 are realised as magnets that are sunk into the carrier element 24 or the function cover 34 (first device-side magnet 23.1, second device-side magnet 23.2).

In the embodiment according to FIGS. 9-12, not all positions of the holding elements 21 of a holding appliance 20 in/on the carrier element or function cover 34 are matched exactly to the positions of the magnetic regions (3.1 and 3.2) on the carrier plate 1 when the carrier plate 1 is situated in the desired nominal position relative to the carrier element/function cover. Instead, the position of two device-side magnets 23.2 is arranged acentrically with respect to the corresponding magnetic regions 3.2 on the carrier plate 1 when the carrier plate 1 is located in the desired position. This has the effect that the carrier plate 1 is adequately fixed via the first device-side magnet 23.1 and the second device-side magnet 23.2 whose position is matched precisely to the position of the corresponding first magnetic region 3.1 and of the corresponding second magnetic region 3.2 on the carrier plate 1, when the carrier plate 1 is also situated in the desired alignment.

However, if the carrier plate 1 is not situated in the desired alignment, then a repelling force is produced between the device-side magnets (23.1 and 23.2) whose position is matched precisely to the position of the corresponding magnetic regions (3.1 and 3.2) on the carrier plate 1, and the mentioned magnetic regions (3.1 and 3.2), by which means these do not contribute to the fixation of the carrier plate 1. A torque is therefore produced upon the carrier plate 1 in combination with the attracting force which arises between the device-side second magnets 23.2 which are arranged accentrically with respect to the corresponding second magnetic regions 3.2 on the carrier plate 1. This leads to the carrier plate 1 noticeably moving out of the desired position in a visually ascertainable manner on fixation.

The accentric displacement of positions of device-side magnets on the carrier element 24 or function cover 34 consequently represents a further embodiment of a positioning appliance.

Expressed generally, the holding elements 21 of a holding appliance 20 can be arranged relative to one another such that their positions are only approximately transposable into themselves by way of a symmetry transformation. A positioning appliance then at the device side is characterised in that it includes at least one holding element 21, whose relative position is displaced accentrically with respect to that position that would be necessary for an exact transposition of the positions of the holding elements 21 under the symmetry transformation.

In this case, the positions (but not necessarily their magnetic characteristics) of the magnetic regions (3.1 and 3.2) on the carrier plate 1 can be transposed into themselves under each symmetry transformation of the basic shape of the carrier plate 1.

In the embodiment which is shown in FIGS. 9-12, the holding elements 21 of a holding appliance 20 are arranged essentially in the corners of an imagined rectangle. A rotation by 180° about an axis that is normal to the surface of the imagined rectangle and goes through the middle point of the imagined rectangle represents a symmetry transformation that transposes the positions of the holding elements (or of the device-side magnets) into themselves. In the shown embodiment, two device-side magnets 23.2 are displaced relative to one another along the diagonals of the imagined rectangle and relative to the positions that would lead to an exact transposition of the positions of the holding elements 21 under the previously described rotation.

FIG. 9 shows the relative arrangement of the carrier plate 1, its first magnetic region 3.1 and its second magnetic regions 3.2, of the carrier element 24 or of the function cover 34, as well as of the first device-side magnet 23.1 and of the second device-side magnets 23.2.

FIG. 10 shows a section along the axis A-A of FIG. 9.

FIG. 11 is a detailed view of the region that is characterised at E in FIG. 10 and shows a second device-side magnet 23.2 that is accentrically displaced relative to the position of the corresponding magnetic region 3.2 on the carrier plate 1. An accentric displacement with respect to the position of the corresponding magnetic region 3.2 on the carrier plate 1 in this case is synonymous with an accentric displacement with respect to a position that would be necessary for an exact transposition of the positions of the magnets of the holding appliance 20 into themselves under the aforementioned symmetry transformation.

FIG. 12 in each case shows a detailed view of the regions which are characterised in FIG. 9 at C and D. The relative displacement of the second device-side magnets 23.2 along the diagonal of the imaged rectangle is shown. In the shown embodiment, it is this displacement that leads to the mentioned accentric displacements.

Instead of changing the position of one or more device-side magnets or coils in comparison to an exact symmetrical arrangement, magnetic regions can also be accordingly changed in their relative position on the carrier plate 1. In particular, such a carrier plate 1 can include at least two magnetic regions 3.2 and a basic shape which has at least one symmetry transformation under which the basic shape is transposed into itself and under which the positioning appliance is not only not transposed into itself because a first magnetic region 3.1 is not transposed into a first magnetic region 3.1 and/or a second magnetic region 3.2 is not transposed into a second magnetic region 3.2, but also because two second magnetic regions 3.2 are arranged on an axis of symmetry of the basic shape and are displaced relative to one another along the axis of symmetry in comparison to other magnetic regions which are arranged on an equivalent symmetry axis of the basic shape.

The basic shape of the carrier plate 1, which is shown in FIGS. 9-11, is that of a rectangle, by which means a rotation by 180° about the axis that is normal to the upper side 8 of the carrier plate and goes through the middle point of the rectangle, but also mirroring along the diagonal and the median lines are symmetry transformations of the basic shape.

In order to provide the effect of a noticeable and/or visually ascertainable movement of the carrier plate out of the desired position, for example two second magnetic regions 3.2 can be displaced towards one another along a diagonal of a rectangular basic shape.

The two second magnetic regions 3.2 can also be displaced along the diagonal in the same direction. In this case, given an incorrect alignment of the carrier plate, a translatory instead of a rotational movement sets in when the carrier plate 1 is fixed on the holding appliance 20.

The invention claimed is:

1. A carrier plate for an electrophoresis device, the carrier plate comprising:
   two flat sides that are parallel to one another, one of the two flat sides being a sample side forming a sample area configured to have samples deposited thereon,
   a region with a magnetic characteristic,
   a positioning appliance, and
   a fixation layer for a carrier medium,
   wherein the magnetic characteristic is configured to fix the carrier plate in the electrophoresis device, and
   wherein the positioning appliance is configured to guarantee a position of the carrier plate in the electrophoresis device,
   wherein the sample area and the region with the magnetic characteristic are not overlapping,
   wherein the sample area is an inner surface of the sample side, said inner surface being continuous, or the carrier plate comprises an object carrier and the sample area is a surface of the object carrier, said surface being continuous.

2. The carrier plate according to claim 1, wherein:
   the carrier plate has a basic shape and the positioning appliance is configured for positioning and aligning the carrier plate in a desired position and a desired alignment in the electrophoresis device, and
   the basic shape has at least one symmetry transformation, under which the basic shape is transposed into itself and under which the positioning appliance is not transposed into itself.

3. The carrier plate according to claim 2, wherein the positioning appliance comprises the region with the magnetic characteristic and the positioning appliance is not transposed into itself under the symmetry transformation because the region with the magnetic characteristic is not transposed into itself.

4. The carrier plate according to claim 3, wherein a magnetic field which is produced by the region with the magnetic characteristic is not symmetrical under the symmetry transformation of the basic shape.

5. The carrier plate according to claim 4, wherein a direction of the produced magnetic field has changed at a position of the basic shape, said basic shape having been transposed into itself by the symmetry transformation.

6. The carrier plate according to claim 1, wherein the region with the magnetic characteristic is magnetized along a direction which runs parallel to the normal of the sample side.

7. The carrier plate according to claim 1, wherein the region with the magnetic characteristic comprises a magnet and the magnetic characteristic of the region corresponds to the magnetic characteristic of the magnet.

8. The carrier plate according to claim 1, wherein:
   the region with the magnetic characteristic is a first magnetic region and the carrier plate comprises a second magnetic region,
   the first magnetic region is magnetized along a first direction and the second magnetic region is magnetized along a second direction which differs from the first direction, and
   the positioning appliance comprises the first magnetic region and the second magnetic region.

9. The carrier plate according to claim 8, comprising at least two second magnetic regions and a basic shape which has at least one symmetry transformation, under which the basic shape is transposed into itself and under which the positioning appliance is not transposed into itself,
   wherein the positions of the second magnetic regions are arranged on the carrier plate such that these positions are not transposed into themselves under the symmetry transformation, or the second magnetic regions are arranged on a symmetry axis of the basic shape and are displaced relative to one another along the symmetry axis in comparison to other magnetic regions which are arranged on an equivalent symmetry axis of the basic shape.

10. The carrier plate according to claim 1, wherein the sample area is at least one of uninterrupted, hole-free, opening-free, recess-free, and planar.

11. The carrier plate according to claim 1, wherein the carrier plate, except the region with the magnetic characteristic, is made of plastic or of glass.

12. The carrier plate according to claim 1, wherein the carrier plate comprises the inner surface, and further comprises an edge region and markings,
   wherein the markings are configured to unambiguously identify a multitude of sample positions on the carrier plate.

13. The carrier plate according to claim 12, wherein the markings and the at least one region with the magnetic characteristic are arranged in the edge region.

14. The carrier plate according to claim 1, wherein the carrier plate comprises the object carrier, and the object carrier is an object carrier for spectroscopic applications.

15. The carrier plate according to claim 14,
wherein the carrier plate comprises an inner region and an edge region,
wherein the object carrier is arranged in the inner region and is connected to the edge region via a predetermined breaking point.

16. A holding appliance for the carrier plate according to claim 1, wherein:
the holding appliance is configured for assembly in an electrophoresis device,
the holding appliance comprises a holding region, in which the holding appliance is magnetic or magnetizable, and
the holding region is configured to fix the carrier plate in the electrophoresis device.

17. The holding appliance according to claim 16, wherein the holding region comprises a holding appliance magnet and/or is produced by a coil.

18. The holding appliance according to claim 16, wherein:
the holding region is a first holding region,
the holding appliance comprises a second holding region, in which the holding appliance is magnetic or magnetizable, and
the first holding region is arranged relative to the second holding region in a manner such that an exact transposition of the positions of the holding regions under a symmetry transformation is rendered impossible.

19. The holding appliance according to claim 18, wherein the exact transposition of the positions of the holding regions under the symmetry transformation is rendered impossible because the first holding region and the second holding region are displaced out of their symmetrical positions along a straight line which connects these holding regions.

20. An electrophoresis device, comprising a holding appliance according to claim 16.

21. An electrophoresis device according to claim 20, comprising a plurality of measuring electrodes and measurement electronics,
wherein the measuring electrodes are arranged in the electrophoresis device such that the strength and direction of an electrical field which is produced by the electrophoresis device, at different positions in the electrophoresis device, can be measured and/or computed amid the use of the measurement electronics.

22. An appliance comprising the carrier plate according to claim 1 and a holding appliance, wherein:
the holding appliance is configured for assembly in an electrophoresis device,
the holding appliance comprises a holding region having a magnetic characteristic by the holding appliance being magnetic or magnetizable in the holding region,
the holding region is configured to fix the carrier plate in the electrophoresis device;
the magnetic characteristic of the holding region is matched to the magnetic characteristic of the region with the magnetic characteristic of the carrier plate such that the carrier plate can only be fixed in a desired position and desired alignment relative to the holding appliance.

23. The appliance according to claim 22, wherein the magnetic characteristic of the holding region and the magnetic characteristic of the region with the magnetic characteristic are matched to one another such that only attracting magnetic forces are produced between the carrier plate and the holding appliance when the carrier plate is situated in the desired position and desired alignment.

* * * * *